United States Patent [19]
Morrison

[11] Patent Number: 6,145,678
[45] Date of Patent: Nov. 14, 2000

[54] ADJUSTABLE, SUSPENDED OVERHEAD STORAGE RACK

[76] Inventor: Robert C. Morrison, 1875 7th St., Oroville, Calif. 95965

[21] Appl. No.: 09/099,135

[22] Filed: Jun. 18, 1998

[51] Int. Cl.[7] .................................................... A47F 5/08
[52] U.S. Cl. ........................................... 211/113; 248/340
[58] Field of Search .................................... 211/113, 117, 211/118; 248/343, 340, 215, 214, 301

[56] References Cited

U.S. PATENT DOCUMENTS

| | | | |
|---|---|---|---|
| 1,814,688 | 7/1931 | Goodrich . | |
| 2,057,092 | 10/1936 | Geib . | |
| 2,343,490 | 3/1944 | White | 211/117 |
| 2,645,358 | 7/1953 | Moore et al. | 211/118 |
| 3,283,914 | 11/1966 | Robinson | 248/340 |
| 3,907,118 | 9/1975 | Pelavin | 211/113 |
| 3,945,462 | 3/1976 | Griswold | 248/340 |
| 4,142,705 | 3/1979 | Miller | 248/215 |
| 4,333,575 | 6/1982 | Wong | 211/118 |
| 4,412,677 | 11/1983 | Varamontes | 211/117 |
| 4,424,908 | 1/1984 | Davitz | 211/118 |
| 4,510,872 | 4/1985 | Parry | 248/340 |
| 4,944,434 | 7/1990 | Hamilton | 248/215 |
| 4,949,924 | 8/1990 | Carmody | 248/315 |
| 5,143,335 | 9/1992 | Frankel | 248/315 |
| 5,242,269 | 9/1993 | Chang | 248/343 |
| 5,351,926 | 10/1994 | Moses | 248/343 |
| 5,553,823 | 9/1996 | Protz, Jr. | 248/315 |
| 5,615,783 | 4/1997 | Warnken | 211/118 |
| 5,623,789 | 4/1997 | Kidwell et al. | 248/343 |
| 5,695,079 | 12/1997 | Peay | 211/118 |
| 5,749,479 | 5/1998 | Belokin et al. | 211/118 |
| 5,873,556 | 2/1999 | Reiker | 248/343 |

*Primary Examiner*—Daniel P. Stodola
*Assistant Examiner*—Jennifer E. Novosad
*Attorney, Agent, or Firm*—Rodger H. Flagg

[57] ABSTRACT

An adjustable storage rack apparatus for suspension from an overhead support, for storage of selected objects, such as boxes, lumber, pipe, sports equipment. First and second hanger members form an inverted U-shaped bracket sized to fit over the overhead support. The first side of each of the first and second hanger members extends below the inverted U-shaped bracket, and the second side of each of the first and second hanger members is bent to form a U-shaped bracket for supporting at least one object therefrom. Respective first and second elongated angle members each have first and second legs extending at right angles, and the first leg of the respective first and second elongated angle members are each adjustably secured to the lower end of the first side of the respective first and second hanger members. A substantially horizontal cross bar is selectively secured to either the first or second legs of each of the first and second elongated angle members, to form a substantially horizontal support therebetween.

At least one horizontal planar member may extend between aligned cross bars, to form a platform for receiving at least one object thereon. Where the cross bar(s) extend beyond the first and second elongated angle members, additional horizontal planar members may be secured to the cross bar portion extending beyond the first and second elongated angle members. A ceiling bracket may be used to secure the first hanger support member to the overhead structural support.

19 Claims, 2 Drawing Sheets

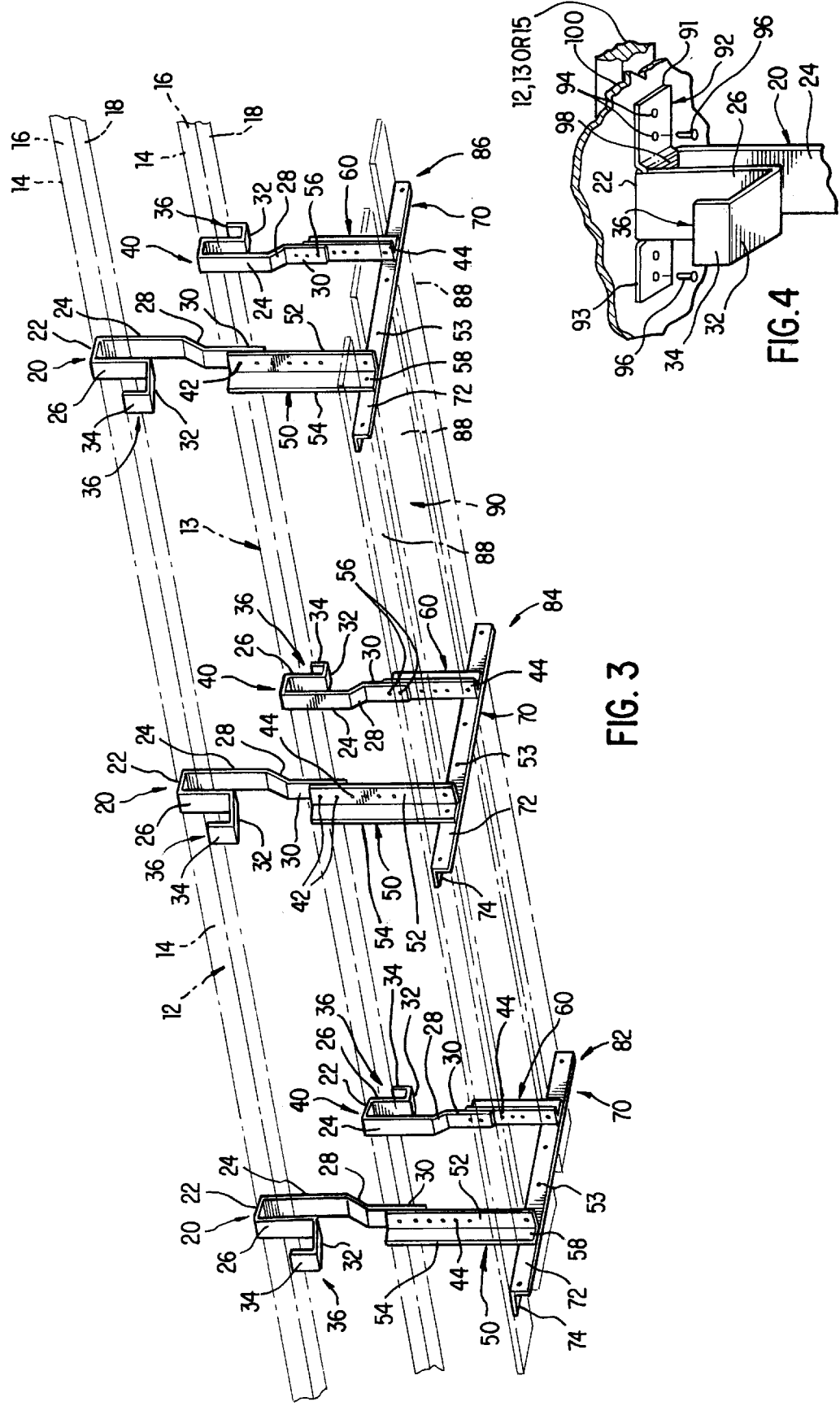

ADJUSTABLE, SUSPENDED OVERHEAD STORAGE RACK

TECHNICAL FIELD

The present invention is directed to storage racks, more specifically to storage racks adapted for suspension from an overhead support, such as beams, roof joists or rafters.

RELATED PRIOR ART

U.S. Pat. No. 4,412,677 issued Nov. 1, 1983 to Viramontes, discloses a portable chinning exercise apparatus which is suspended from a pair of inverted U-shaped brackets for support from an overhead rafter.

U.S. Pat. No. 3,945,462 issued Mar. 23, 1976 to Griswold, discloses hanger brackets for support of a suspended scaffold or platform from overhead supports.

U.S. Pat. No. 2,057,092 issued Oct. 13, 1936 to Geib, discloses a suspended platform which is supported by chains extending from inverted U-shaped members sized to fit over overhead beams.

U.S. Pat. No. 1,814,688 issued Jul. 14, 1931 to Goodrich, discloses a scaffold adjustably suspended from a horizontal beam for supporting a horizontal plank floor thereon.

SUMMARY OF THE INVENTION

This invention relates to storage rack apparatus, for suspension from an overhead support, for support and storage of at least one object thereon. The storage rack apparatus comprises first and second hanger support members having an inverted U-shaped bracket sized to fit over a support, such as a beam, joist or rafter. The first and second hanger support members each have a top portion sized to fit over the overhead support, with a first upper side portion extending at least the length of the overhead support. The first side portion has an inclined offset portion extending substantially beneath the centerline of the top portion, with a lower first side portion extending beneath the inclined offset portion substantially parallel to the upper first side portion.

The first and second hanger support members each have a second upper side portion extending from the top portion in spaced, substantially parallel relation to the first upper side portion, thus forming an inverted U-shaped bracket spaced to receive the support member between the first and second upper side portions.

A top support bracket extends from the lower portion of the second upper side portion, substantially parallel to the top portion, with a third side portion extending upwardly in spaced relation from the second upper side portion, thus forming a U-shaped top support bracket for supporting at least one object therefrom.

First and second elongated angle members each have a first leg and a second leg, with the first leg adjustably secured to the upper end of the lower first side portion of the respective first and second hanger support members.

A cross bar may be secured to either the first or second leg of the elongated angle members in proximity to the lower end of the first and second elongated angle members, in substantially horizontal alignment, to position the cross bar either parallel or perpendicular to the overhead structural supports, to suit the user's needs.

The cross bar is positioned to extend beyond the first and second elongated angle members to form a center support between the first and second elongated angle members. The cross bar preferably extends beyond the first and second elongated angle members to form outer supports on each side of the center support.

A plurality of apertures extend in spaced relation through the first leg of each of the elongated angle members, to adjustably position the cross bar in substantially horizontal relation, regardless of the slope or incline of the overhead structural supports.

Two or more sets of the first and second hanger support members are aligned along the overhead supports to provide support for one or more horizontal planar members which are supported in spaced relation by at two or more cross bars.

The above mentioned and other features and objects of the invention and the manner of attaining them will become more apparent and the invention itself will be best understood by reference to the following description of an embodiment of the invention, when considered in conjunction with the accompanying drawings.

BRIEF DESCRIPTION OF THE DRAWINGS

FIG. 3 is a perspective view of the adjustable storage rack apparatus, with three first and second hanger support members, which are adjustably secured to respective first and second elongated angle members, which are secured to respective cross bars extending perpendicular to the direction of structural supports, for support of a plurality of horizontal planar members between the cross bars.

FIG. 4 is a perspective view of a ceiling bracket used to secure the upper portion of the first hanger support member to an overhead structural support.

BEST MODE FOR CARRYING OUT THE INVENTION

Figure 1:
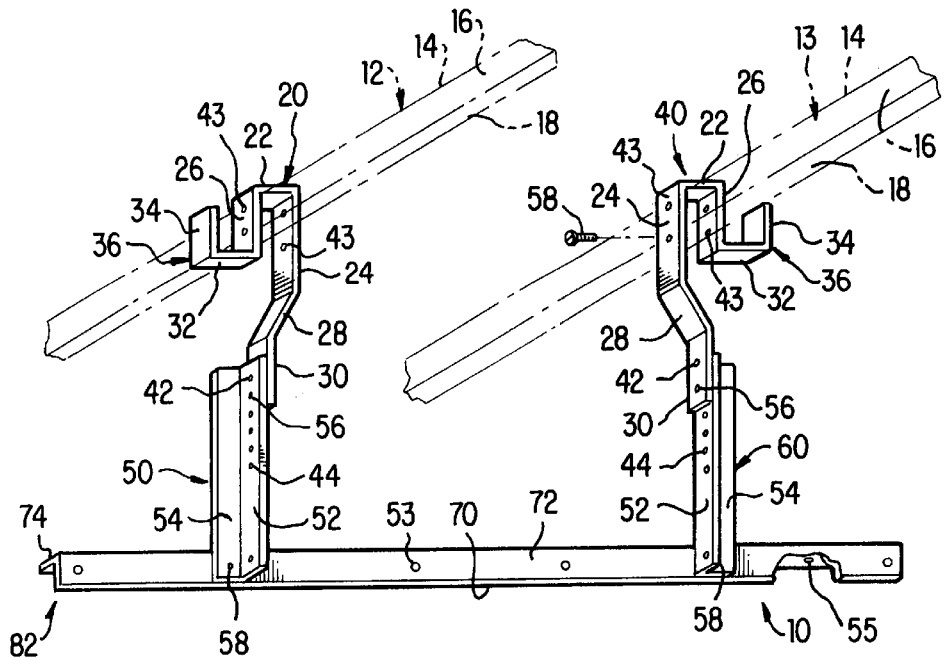
FIG. 1 is a perspective view of the first and second hanger support members, adjustably secured to respective first and second elongated angle members, which are secured to a cross bar shown extending perpendicular to the direction of structural supports.

The subject matter which I regard as my invention is particularly pointed out and distinctly claimed in the claims. The structure and operation of my invention, together with further objects and advantages, may be better understood from the following description given in connection with the accompanying drawings, in which:

FIG. 1 is a perspective view of the storage rack apparatus 10, which is intended for use in a building, garage, basement or attic, etc. where overhead supports 12, 13, etc. such as beams, rafters or joists, support an overhead building structure (not shown).

Each overhead structural support 12 typically has a top portion 14, first and second side portions 16, and a bottom portion 18, typically made of standard building materials, such as wood, metal, or fiberglass. These overhead structural supports 12, 13, 15, may be in the form of a rectangular beam, box section, I-beam or channel, etc., typically used in building construction. These overhead structural supports 12, 13 and 15 are typically uniformly spaced in parallel alignment to provide support for a portion of the building structure. Parallel spacing is often selected from 16 inches to 48 inches from center line to center line, with 24 inch parallel spacing being most common for overhead structural supports 12 for garages, storage buildings, etc.

A first hanger support member 20 is preferably formed of metal, such as flat bar stock, to provide strength and flexibility, and is sized to safely support the intended load.

The first hanger support member 20 has a top portion 22 which is intended to rest on the top portion 14 of a first selected overhead structural support 12. A first upper side portion 24 depends from the top portion 22 and is positioned adjacent to the first side 16 of the overhead structural support 12.

Extending from the lower portion of the first upper side portion 24 is an inclined offset portion 28 positioned to depend substantially beneath the overhead structural support 12, approximately in line with the centerline of the structural support 12. Depending from the inclined offset portion 28 is a lower first side portion 30 which depends substantially parallel to the upper first side portion 24.

A second upper side portion 26 depends from the top portion 22 in spaced parallel alignment to the first upper side portion, forming an inverted U-shaped member sized to receive the opposing sides 16 of the overhead structural support member 12, 13, or 15, etc. therebetween. The flexibility of the first hanger support member is important, to receive a structural support member 12 which is twisted, or of non-standard width, etc.

Preferably, the inverted U-shaped member is sized about one-eight inch larger than the structural support member 12, for ease of installation, misalignment, etc.

A top support bracket 36 has a support portion which extends from the lower portion of the second upper side member 26, substantially parallel to the top portion 22, with a third side portion 34 extending upwardly in spaced relation from the second side portion 26, thus forming a U-shaped top support bracket 36 for supporting or suspending at least one object thereon, such as building materials, a ladder, furniture, sports equipment, etc.

Where the structural support members 12, 13, etc. are flush with the ceiling or roof, the hanger support members 20, 40 may be secured by suitable fastener means through apertures 43 directly to the sides 16 of the structural support members 12, 13, etc.

Preferably, apertures 43 extend through both the first and second upper side portions 24, 26, of the hanger support members 20, 40, to enable either side portion 24 or 26 to be placed adjacent to side 16 of the overhead structural support 12 or 13, to provide additional design and assembly flexibility.

A suitable fastening means 58 may also be used through apertures 43, even when the top portion 22 of a hanger support member 20 is supported by the top 14 of the overhead structural support 12, to ensure that hanger support member 20 does not slide or move during use, as selected objects are added or removed from the apparatus 10.

Alternately, where the overhead structural support 12 or 13 is located within the ceiling structure and covered by a ceiling covering 100 adjacent to bottom 18 of the overhead structure, a ceiling bracket 92 may be used to secure the top portion 22 of the first hanger support member 20 to the side 18 of the overhead structural support 12 or 13. The ceiling bracket 92 is placed beneath top portion 22 and secured with a suitable fastening means 96 through apertures 94 located on each side of top portion 22 as best shown in FIG. 4.

The second hanger support member 40 is substantially identical to the first hanger support member 20, and is intended to be supported from a selected overhead structural support, such as 13 shown in FIG. 1 and FIG. 3. Alternately, the first and second hanger support members 20, 40 may be supported from the same overhead structural support, such as shown in FIG. 2.

The first and second hanger support members 20, 40 are preferably installed on selected overhead structural supports 12, 13 in aligned, opposing relation, so that the top support brackets 36 face away from each other, as best shown in FIG. 1.

Figure 2:
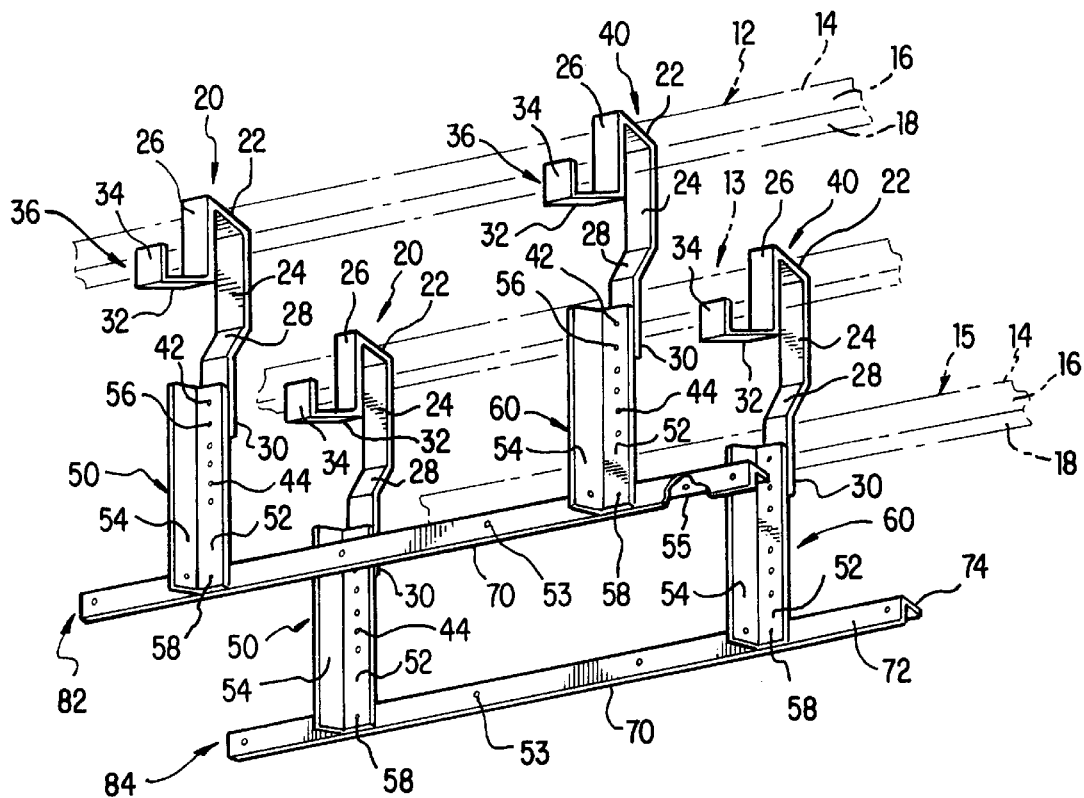
FIG. 2 is a perspective view of the adjustable storage rack apparatus, with two first and second hanger support members, which are adjustably secured to respective first and second elongated angle members, which are shown secured to respective cross bars extending parallel to the direction of structural supports.

Alternately, the top support brackets 36 may face the same direction as best shown in FIG. 2.

For ease of identification, the substantially identical component parts of the second hanger support member 13 share the identical reference numbers used to identify similar component parts of the first hanger support member 12.

A first elongated angle member 50, comprises an elongated angle having a first leg 52, with a second leg 54 disposed at right angles (tangent) to the first leg. The first leg 52 of the elongated angle member 50 is adjustably secured 42 to the lower first side portion 30 of the first hanger support member 20, by any conventional fastening means 58, such as bolts, screws, etc.

The fastening means 58 (of adjustable securement 42) is preferably closely received through at least one of a plurality of apertures 44 disposed in spaced relation through the lower first side portion 30 of the first hanger support member 20 and through a selected one of a plurality of apertures 56 through the first leg 52 of the first elongated angle member 50.

The adjustable securement 42 of the lower side portion 30 of the first hanger support member 20 to the first elongated angle member 50, and the adjustable securement 42 of the lower side portion 30 of the second hanger support member 40 to the second elongated angle member 60 with a suitable fastening means 58, enables the user to selectively position the storage rack in a substantially horizontal plane, even where the overhead structural supports 12, 13 are not level, such as on an inclined or sloping roof structure, etc.

Likewise, a second elongated angle member 60, is substantially identical to the first elongated angle member 50, and is adjustably secured 42 to the lower first side portion 30 of the second hanger support member 40, by any conventional fastening means 58.

The first and second elongated angle members 50, 60 are preferably installed on respective first and second hanger support members 20, 40 in opposing relation, so that the first legs 52 face away from each other, while the second legs 54 are positioned on a uniform plane, to receive and secure a cross bar 70 thereto. See FIG. 1 and FIG. 3.

Cross bar 70 is secured to the first and second elongated angle members 50, 60 by conventional fastening means 58, and cross bar 70 is preferably positioned in a substantially horizontal alignment, as best shown in FIG. 1.

The cross bar 70 must be sufficiently strong to safely support the intended load placed upon the cross bar 70. Cross bar 70 may be any conventional material such as a wooden beam, etc. However, cross bar 70 is preferably made of a structural metal angle having a first leg 72 and a second leg 74 disposed at right angles (tangent) to the first leg 72. A plurality of apertures 53 preferably extend through the first leg 72 in spaced relation, for ease of securing the first leg 72 to the first or second elongated angle member 50, 60. Likewise, a plurality of apertures 55 preferably extend through the second leg 74 in spaced relation, for ease of securing suitable planar support members 88 thereto, to form a suitable platform 90 to support selected objects (not shown) thereon.

In one embodiment, the first leg 52 is secured to the second leg of the elongated angle members 50, 60, with the second leg 54 positioned substantially horizontally to receive at least one object (not shown) thereon. This allows an elongated object to be stored parallel to the direction of the overhead structural supports 12, 13, 15. See FIG. 3.

Alternately, the cross bar 70 may be secured to the first leg of the elongated angle members 50, 60, as best shown in FIG. 2. This enables elongated objects to be stored perpendicular to the direction of the overhead structural supports 12, 13, 15, etc.

The first and second hanger support members 20, 40; first and second elongated angle members 50, 60; and the cross bar 70 are assembled together to form the first storage rack assembly 82 shown in FIG. 1. Likewise, a second storage rack assembly 84 may also be assembled as shown in FIG. 2, and a third storage rack assembly 86 may be assembled as shown in FIG. 3. Where objects of increased length are to be stored, or where it is desired to extend the storage space provided by the storage rack apparatus 10, more than three storage rack assemblies (not shown) may be aligned in the manner shown in FIG. 2 or FIG. 3.

The first leg 72 of cross bar 70 preferably has six apertures 53 disposed in spaced relation, to enable the user to secure the first and second elongated angle members 50, 60 to the cross bar 70, through aligned apertures 53, 56 with a suitable fastening means 58, such as a bolt, at a selected one of three different widths. Apertures 55 in the second leg 74 are preferably sized to receive a fastening means 58, such as a wood screw therethrough, to attach the planar support members 88 to the second leg 74 of the cross bar 70.

Apertures 53 in the first leg 72 of the cross bars 70, may be secured to either the first or second leg 52, 54 of the first and second elongated angle members 50, 60 to enable the assembled storage rack assemblies 82, 84, 86 to be positioned either parallel (see FIG. 2) or perpendicular (see FIG. 3) to the overhead structural supports 12, 13, 15, etc.

The plurality of apertures 44 located in the first leg 52 of the first and second elongated angle members 50, 60, enable cross bars 70 of each of the storage rack apparatus 10 to be assembled substantially horizontally regardless of the slope or incline of the overhead structural supports 12, 13, 15.

Where more than one storage rack assembly 82, 84, 86 are used, one or more horizontal planar supports 88 may be placed over the cross bars 70, to form a platform 90 for storing various objects (not shown) [80] thereon. Likewise, objects may be placed upon, or suspended from the top support brackets 36 extending from each hanger support member 20, 40.

Where the cross bar 70 is positioned to extend beyond the first and second elongated angle members 50, 60, as shown in FIG. 2, additional horizontal planar supports 88 may also be placed on the extended portions of the cross bar 70, further increasing the storage space provided.

The horizontal planar supports 88 may be secured to the cross bar 70 by any suitable conventional fastening means 58, to ensure that the horizontal planar supports 88 do not fall as objects are being placed, removed, or maneuvered upon the storage rack apparatus 10.

In operation, the storage rack apparatus 10 may be installed upon existing overhead structural supports 12, 13, 15, etc. regardless of the spacing or incline of the structural supports 12, 13, 15, etc. The fastening means 58 may adjustably position the first and second angular members 50, 60 to support the cross bar 70 in a substantially horizontal position, either parallel or perpendicular to the direction of the structural supports 12, 13, 15, etc. regardless of the slope or incline of the overhead structural supports 12, 13, 15, etc.

More than one storage rack assembly 82, 84, 86 may be aligned to receive and support elongated objects (not shown), such as pipe, lumber, etc. upon two or more suitably spaced cross bars 70.

Where two or more storage rack assemblies 82, 84, 86 are installed, one or more elongated planar supports 88 may be supported upon the two or more substantially horizontally aligned cross bars 70 to form a platform 90 upon which suitable objects 80 may be stored. The platform 90 may extend between cross bars 70, centered between the first and second elongated angle members 50, 60. Additional planar supports 88 may be installed upon the cross bars 70 on each side of the second elongated angle members 50, 60, to increase the size of platform 90.

One or more portions of the cross bar may be left without a planar support 88, for receiving elongated storage objects 80, such as pipe, lumber, etc. The objects may be loaded upon the platform 90, or upon the cross bars 70 from either side or from either end of the storage rack apparatus 10, to suit the environment in which the storage rack apparatus 10 is installed, and the preference of the user.

The storage rack assembly 10 disclosed herein, may be used to support a variety of objects 80 in space otherwise not used, such as in a garage over the hood of a car, or suspended from the ceiling in a basement, or from rafters in a roof enclosure, or to provide additional storage space in a shed or storage room, etc. The storage rack assembly 10 may also be positioned in a garage so that a full size truck can park underneath a fully extended rack.

The top brackets 36 extending from each of the first and second U-shaped hanger support members 20, 40 provide additional support for elongated objects 80, or may be used to suspend additional objects 80 therefrom, thereby increasing the capacity and utility of the storage rack apparatus 10.

The adjustable, suspended storage rack apparatus 10 may be suspended from exposed rafters 12, as shown in FIG. 1 through FIG. 3, or may be supported from an overhead ceiling structure 100 with the aid of a ceiling bracket 92 having a central portion 98 positioned beneath the top portion of the hanger support member 20. The opposing ends 91 of the ceiling bracket 92 are secured to the ceiling structure 100 with suitable fastening means 96 which extend through apertures 94 in the ceiling bracket 92, as shown in FIG. 4.

Although the present invention has been illustrated and described in connection with an example embodiment, it will be understood that this specification is illustrative of the invention, and it is by no means restrictive thereof. It is reasonably to be expected that those skilled in the art can make numerous revisions and additions to the invention, and it is intended that such revisions and additions will be included within the scope of the following claims as equivalents of the invention.

IMPROVED STORAGE RACK

Parts List

10—storage rack apparatus
12, 13, 15—overhead structural support(s)

14—top portion
16—first and second side portions
18—bottom portion
20—first hanger support member
22—top portion
24—first upper side portion
26—second upper side portion
28—inclined offset portion
30—lower first side portion
32—horizontal portion
34—third side portion
36—U-shaped top bracket
38—top support bracket
40—second hanger support member
42—adjustably secured
43—apertures
44—apertures
50—first elongated angle member
52—first leg
53—apertures
54—second leg
56—apertures
58—securement means
60—second elongated angle member
70—cross bar
72—first leg
74—second leg
80—elongated objects
82—first storage rack assembly
84—second storage rack assembly
86—third storage rack assembly
88—planar support member(s)
90—platform
92—ceiling clamp
94—apertures
96—fastening means
98—top portion offset
100—existing ceiling

What is claimed is:

1. An adjustable storage rack apparatus for suspension from an existing overhead support, for storage of at least one selected object(s) thereon, which comprises:

a) first and second hanger support members, each with a top portion, a first upper side portion positioned below the top portion, a second upper side portion positioned below the top portion in spaced relation from the first upper side portion, to form an inverted U-shaped member to fit upon an existing overhead support member, a support bracket which is positioned between a lower portion of the second upper side member and a third side portion positioned upwardly in spaced relation from the second upper side portion to form a substantially U-shaped top support bracket therebetween; the first upper side portion with an inclined offset portion positioned substantially beneath the top portion, with a lower first side portion positioned beneath the inclined offset portion substantially parallel to the upper first side portion, the lower first side portion of each of the first and second hanger support members with at least two apertures in vertically spaced alignment therethrough;

b) a first and second elongated angle member, each elongated angle member with a first leg and a second leg disposed at right angles to the first leg, an upper end of each first leg with a plurality of holes in vertically spaced alignment therethrough, the first leg of each of the first and second elongated angle members adjustably secured by a fastening means positioned through vertically aligned apertures in the upper end of the lower first side portion of respective first and second hanger support members and through vertically aligned apertures in the upper end of the respective first leg of the respective first and second elongated angle members;

c) a cross bar secured to a selected one of the first and second legs of each of the first and second elongated angle members with a fastening means, said cross bar positioned substantially horizontally between the first and second elongated angle members to form a center support therebetween, the cross bar sized to extend beyond the respective first and second angle members to provide outer supports on each side of the center support without any portion of the first and second elongated angle members positioned below the substantially horizontally positioned cross bar.

2. The apparatus of claim 1, wherein at least two storage rack apparatuses are positioned in aligned, spaced relation from the existing over head supports.

3. The apparatus of claim 1, wherein at least three storage rack apparatuses are positioned in aligned, spaced relation from at lease one existing overhead support.

4. The apparatus of claim 1, wherein at lease one substantially horizontal planar support member is positioned between at least two cross bars supported in aligned, spaced relation from at least one existing overhead support.

5. The apparatus of claim 1, wherein at least one substantially horizontal planar support member is positioned between at least three cross bars supported in aligned, spaced relation from at least one existing overhead support.

6. The apparatus of claim 1, wherein a ceiling bracket having a central portion positioned beneath the top portion of the first hanger support member, and at least one fastening means is positioned through apertures in opposing ends of the ceiling bracket to secure the hanger support member to the existing overhead support.

7. The apparatus of claim 1, wherein the cross bar is an angle member with a first leg and a second leg disposed at right angles to the first leg, with the first leg of the cross bar secured to a selected one of the first and second legs of the respective first and second elongated angle members, and the second leg of the cross bar is positioned to support at least one selected object(s) thereon.

8. An adjustable storage rack apparatus for suspension from at least one existing overhead support, for storage of at least one selected object(s) thereon, which comprises:

a) first and second hanger support members, each hanger support member with a top portion, a first upper side portion positioned below the top portion, a second upper side portion positioned below the top portion in spaced relation from the first upper side portion to form an inverted U-shaped member to fit upon an existing overhead support; the first side portion with an inclined offset portion positioned substantially beneath the centerline of the top portion, with a lower first side portion positioned beneath the inclined offset portion substantially parallel to the upper first side portion, the lower first side portion of each of the first and second hanger support members with at least two apertures in vertically spaced alignment therethrough;

b) a top support bracket with a support portion positioned from the lower portion of the second upper side member, substantially parallel to the top portion of each of the first and second hanger support members, with a third side portion positioned upwardly in spaced relation from the second side portion, thus forming a U-shaped top support bracket for supporting at least one selected object(s) thereon;

c) a first and second elongated angle member, each with a first leg and a second leg disposed at right angles to the first leg, the upper end of each first leg with a plurality of apertures in vertically spaced alignment therethrough, the first leg adjustably secured by a fastening means extending through the vertically aligned apertures in the upper end of the lower first side portion of the respective first and second hanger support members and through a plurality of apertures through the first leg of the respective first and second elongated angle members;

d) a cross bar selectively secured to one of the first and second legs of the elongated angle members with a fastening means, the cross bar positioned beyond the first and second elongated angle members to form a center support between the first and second elongated angle members, and outer supports positioned on each side of the center support, beyond the respective first and second elongated angle members, without any portion of the first and second elongated angle members positioned below the substantially horizontally positioned cross bar; and e) a ceiling bracket having a central portion positioned beneath the top portion of the first hanger support member, and fastening mean s positioned to extend through apertures provided in opposing ends of the ceiling clamp to secure the hanger support member to the existing overhead support.

9. The apparatus of claim 8, wherein at least two storage rack apparatuses extend in aligned, spaced relation from the existing overhead supports, and at least one substantially horizontal planar member is positioned between the cross bar of each of the storage rack apparatuses.

10. The apparatus of claim 8, wherein at least three storage rack apparatuses extend in aligned, spaced relation from the existing overhead supports, and at least one substantially horizontal planar member is positioned between the cross bar of each of the storage rack apparatuses.

11. The apparatus of claim 8, wherein the hanger support members, the elongated angle members, and the cross bar are each made of metal, and secured together with a fastening means at assembly.

12. At least one adjustable storage rack apparatus, for suspension from at least one existing overhead support, for storage of at least one selected object(s) thereon, which comprises:

a) first and second hanger support members, each composed of a top portion, a first upper side portion positioned below the top portion, a second upper side portion positioned below the top portion in spaced relation from the first upper side portion to form an inverted U-shaped configuration to fit upon an existing overhead support therebetween, the first upper side portion with a inclined offset portion positioned substantially beneath the centerline of the top portion, with a lower first side portion positioned beneath the inclined offset portion substantially parallel to the upper first side portion; the lower first side portion of each of the first and second hanger support members with apertures in vertically spaced alignment therethrough, the respective first and second hanger support members each with a top support bracket positioned from the lower portion of the second upper side portion substantially parallel to the top portion, with a third side portion positioned upwardly in spaced relation from the second upper side portion to form a U-shaped bracket therebetween, the U-shaped bracket providing an additional support for storing at least one selected object thereon;

b) a first and second elongated angle member, each angle member with a first leg and a second leg disposed at right angles to the first leg, an upper end of each first leg with a plurality of apertures in vertically spaced alignment therethrough, the first leg of the first elongated angle member adjustably secured by a fastening means positioned through vertically aligned apertures in the upper end of the lower first side portion of the first hanger support member and the first leg of the first elongated angle member, and a fastening means extending through vertically aligned apertures in the upper end of the lower first side portion of the second hanger support member, and the first leg of the second elongated angle member; and c) a cross bar secured to a selected one of the first and second legs of each of the first and second elongated angle members with a fastening means, said cross bar positioned between the first and second elongated angle members to form a substantially horizontal center support therebetween, without any portion of the first and second elongated angle members extending below the substantially horizontally positioned cross bar.

13. The apparatus of claim 12, wherein the cross bar is an angle member with a first leg and a second leg disposed at a right angle to the first leg, with the first leg of the cross bar secured to the selected first leg or second leg of the respective first and second elongated angle members.

14. The apparatus of claim 12, wherein the first and second elongated angle members are adjustably secured to respective first and second hanger support members with fastening means sized to be received through a selected one of a plurality of spaced apertures extending through the upper portion of the first leg of each of the first and second elongated angle members and aligned with an aperture in the lower first side portion of the respective first and second hanger support members.

15. The apparatus of claim 12, wherein at least two first and second hanger support members are each positioned in aligned, spaced relation from at least one existing overhead support.

16. The apparatus of claim 15, wherein at least one substantially horizontal planar support member is positioned between two cross bars supported in aligned, spaced relation from at least one existing overhead support.

17. The apparatus of claim 12, wherein at least three first and second hanger support members are each positioned in aligned, spaced relation from at least one existing overhead support.

18. The apparatus of claim 17, wherein at least one substantially horizontal planar support member is positioned between three cross bars supported in aligned, spaced relation from at least one existing overhead support.

19. The apparatus of claim 12, wherein a central portion of a ceiling bracket is positioned beneath the top portion of the first hanger support member, and a fastening means is positioned through apertures provided in opposing ends of the ceiling bracket to secure the hanger support member to the existing overhead support.

* * * * *